United States Patent
Hurt et al.

(10) Patent No.: US 9,481,122 B2
(45) Date of Patent: Nov. 1, 2016

(54) SYSTEM FOR CONTROLLING CUTTER HUB POSITION IN UNDERFLUID PELLETIZER

(71) Applicant: GALA INDUSTRIES, INC., Eagle Rock, VA (US)

(72) Inventors: David W. Hurt, Clifton Forge, VA (US); Juergen Veltel, Kevelaer (DE); Martin Aholt, Hamminkeln (DE); Damon M. Patton, Roanoke, VA (US); John P. Sprouse, Covington, VA (US)

(73) Assignee: GALA INDUSTRIES, INC., Eagle Rock, VA (US)

( * ) Notice: Subject to any disclaimer, the term of this patent is extended or adjusted under 35 U.S.C. 154(b) by 334 days.

(21) Appl. No.: 14/190,992

(22) Filed: Feb. 26, 2014

(65) Prior Publication Data
US 2014/0284833 A1 Sep. 25, 2014

Related U.S. Application Data

(63) Continuation of application No. 12/801,657, filed on Jun. 18, 2010, now abandoned.

(60) Provisional application No. 61/213,550, filed on Jun. 18, 2009.

(51) Int. Cl.
*B29C 47/92* (2006.01)
*B29C 47/00* (2006.01)
*B29B 9/06* (2006.01)

(52) U.S. Cl.
CPC .............. *B29C 47/92* (2013.01); *B29B 9/065* (2013.01)

(58) Field of Classification Search
CPC .......... B29C 47/92; B29B 9/065; B29B 9/00

USPC ......... 264/40.1, 141, 142; 425/67, 142, 311, 425/313, 162, 164, 169, 171, DIG. 230
See application file for complete search history.

(56) References Cited

U.S. PATENT DOCUMENTS

| | | |
|---|---|---|
| 3,912,434 A | 10/1975 | Nagahara et al. |
| 4,123,207 A | 10/1978 | Dudley |
| 4,184,833 A | 1/1980 | Buchan et al. |
| 4,251,198 A | 2/1981 | Altenburg |
| 4,457,882 A * | 7/1984 | Todd ........................ B29B 9/00 264/142 |
| 4,500,271 A | 2/1985 | Smith |
| 4,529,370 A | 7/1985 | Holmes et al. |
| 4,728,276 A | 3/1988 | Pauley et al. |
| 5,017,119 A * | 5/1991 | Tokoi ....................... B26D 1/29 264/142 |
| 5,059,103 A | 10/1991 | Bruckmann et al. |

(Continued)

FOREIGN PATENT DOCUMENTS

| | | |
|---|---|---|
| DE | 44 08 235 | 2/1995 |
| DE | 203 00 009 | 5/2004 |

(Continued)

*Primary Examiner* — Nahida Sultana
(74) *Attorney, Agent, or Firm* — Jacobson Holman, PLLC

(57) ABSTRACT

A cutter hub position control device for consistent blade adjustment in an underfluid pelletizer is provided in connection with a motion rod attached to the pelletizer cutter hub and extending through a hollow shaft of the pelletizer motor. The cutter hub position control device can be collinear, transaxial or in a plane parallel to the axis of the motion rod to which it is attached. Adjustment of the cutter hub position control device is automated through use of feedback control mechanisms.

20 Claims, 9 Drawing Sheets

(56) References Cited

U.S. PATENT DOCUMENTS

| | | |
|---|---|---|
| 5,110,523 A | 5/1992 | Guggiari |
| 5,330,340 A | 7/1994 | Suppon et al. |
| 5,832,114 A | 11/1998 | Kaneko et al. |
| 6,217,802 B1 | 4/2001 | Messina et al. |
| 6,332,765 B1 | 12/2001 | Spelleken |
| 6,663,372 B2 | 12/2003 | Ready et al. |
| 7,033,152 B2 | 4/2006 | Eloo et al. |
| 7,273,365 B2 | 9/2007 | Murb |
| 7,530,806 B2 | 5/2009 | Pinchot |
| 8,083,509 B2* | 12/2011 | Holmes .................. B29B 9/065 425/313 |
| 8,454,344 B2* | 6/2013 | Holmes .................. B29B 9/065 264/5 |
| 8,496,461 B2* | 7/2013 | Cude ....................... B29C 33/76 425/149 |
| 2004/0009254 A1 | 1/2004 | Eloo et al. |
| 2004/0080066 A1 | 4/2004 | Klammer et al. |
| 2007/0172535 A1* | 7/2007 | Fridley .................. B29B 9/065 425/313 |
| 2010/0330216 A1* | 12/2010 | Hurt ....................... B29C 47/92 425/67 |
| 2013/0004606 A1* | 1/2013 | Holmes .................. B29B 9/065 425/67 |
| 2015/0093531 A1* | 4/2015 | Hur ........................ C08G 64/06 428/36.92 |
| 2015/0099024 A1* | 4/2015 | Murb ...................... B29B 9/06 425/67 |
| 2015/0274919 A1* | 10/2015 | Ackermann ........ B29C 47/0002 264/40.1 |
| 2016/0009014 A1* | 1/2016 | Schmitz .................. B29C 47/56 264/40.1 |

FOREIGN PATENT DOCUMENTS

| | | |
|---|---|---|
| EP | 0 418 941 | 3/1991 |
| JP | H03-173611 | 7/1991 |
| JP | H05-228923 | 9/1993 |
| JP | H06-190800 | 7/1994 |
| JP | H06-218727 | 8/1994 |
| JP | H08-1590 | 1/1996 |
| JP | H11-115159 | 4/1999 |
| JP | 2004-537437 | 12/2004 |
| JP | 2009-006576 | 1/2009 |

* cited by examiner

SYSTEM FOR CONTROLLING CUTTER HUB POSITION IN UNDERFLUID PELLETIZER

This application is a continuation application of U.S. application Ser. No. 12/801,657, filed Jun. 18, 2010, which is now abandoned and which claimed the priority of prior U.S. Provisional application, Ser. No. 61/213,550, filed Jun. 18, 2009, and hereby claims the priority thereof to which it is entitled.

BACKGROUND OF THE INVENTION

1. Field of the Invention

The present invention relates to improvements in underfluid pelletizers and more particularly to providing a cutter hub position control device for an underfluid pelletizer including manual, incremental, and automated operation.

2. Description of the Related Art

Underwater pelletizers are well known and include a die plate with multiple orifices through which molten polymer or other melt-processable strands are extruded with the orifices terminating at a die face on the die plate. A powered rotary cutter including a cutter hub mounted on a motor shaft with a plurality of blades supported from the cutter hub is associated with the die face for shearing the extruded strands into pellets as the polymer is extruded beyond the die face. A transport fluid box encloses the die face, cutter hub and blades to form a cutting chamber through which transport fluid flows to quench and rigidify the extruded strands, thus enabling the cutting blades to better shear the extruded strands into pellets. A motor drives the pelletizer shaft through the transport fluid box and thus powers the rotary cutter. The above described pelletizers, specifically underwater pelletizers, are disclosed in related U.S. patents including U.S. Pat. Nos. 4,123,207, 4,251,198, 4,500,271, 4,728,276, 5,059,103, 6,332,765, and 7,033,152 all owned by the assignee of this invention.

Many known forms of underwater pelletizers rely on manual adjustment by an operator of the blades relative to the die face. This manual adjustment results in limited repeatability as not all operators make blade adjustments in the same way or at the same intervals. Manual adjustment is also affected by the fact that different operators will have varying levels of experience with the particular type of machine being adjusted. In addition, the operator may make too large an adjustment which is detrimental to the life of the blades. An adjustment that is too small could affect the properties of the end product.

Other forms of pelletizers use springs to hold the blades against the die face. As with manual adjustment, springs also produce inconsistencies in the amount of force put on the blades as the force is dependent on the degree to which the spring is compressed. Spring compression is affected by the amount of wear on the blades as well as the amount of wear on the die plate. Outside influences such as the fluid in the transport fluid box can also contribute to forcing of the blades against the die face, shortening the life of the blades.

Still other forms of known pelletizers have relied on a pneumatic cylinder to move the blades into the die plate. Due to the fact that the air in the cylinder is compressible, this methodology is also subject to the outside influences of the water. Substitution of the pneumatic cylinder with a hydraulic cylinder is possible, but the manner in which the adjustments are made can get quite complicated. Hydraulic systems also rely on expensive hydraulic pressure controlling components. Over time, these components may leak which can lead to unwanted movement of the pelletizer blades. At high pressures, the hydraulic lines can expand which would also allow for blade movement.

A hydraulic system also requires some type of feedback to let the control system know if the required blade adjustment action is taking place. This feedback can be provided by some type of load sensing device located at the die plate, or by the amperage (amp) load from the pelletizer motor. However, these feedback mechanisms may not always be accurate enough to properly relay what is occurring.

More specifically, the majority of underwater pelletizer applications require that the blades be at an angle in relation to the die plate in order to cut the pellet and move it away from the die as quickly as possible. Having the blades at an angle and mounted at a given radial distance away from the pelletizer shaft creates a condition in which the action of the blades in the water tends to push the blades against the die plate, much like a boat propeller moves a boat. With either of the load sensing mechanisms identified above, it is possible to get false readings simply due to the action of the fluid.

In addition, certain polymers being extruded and cut by the pelletizer have lubricating qualities. If the amp load of the pelletizer motor is used to detect the load at the die plate, an amp increase may not be generated if the blades cannot create friction on the die plate due to the lubricity of the polymer. This absence of amp increase will result in more force than what is necessary to create the desired load, which is detrimental to the life of the blades.

In sum, the number of blades on the cutter hub, the width of the blades, the transport fluid flow rate, the material being processed, the material flow rate, and the pelletizer speed can all contribute to additional loads on the pelletizer motor. If any of these factors is changed, a different motor load increase will likely be obtained, making blade adjustments difficult, if not impossible, to repeat.

U.S. Pat. No. 3,832,114 discloses a manual coarse and fine adjustment mechanism used independently to optimize the positioning of the cutter hub and thus the cutter blades against the die face. U.S. Pat. No. 3,912,434 automates the coarse and fine adjustment wherein the coarse adjustment is achieved through use of a compressed air cylinder and fine adjustment is accomplished utilizing an electrically controlled worm gear assembly. Feedback is achieved through use of vibrational and/or electrical sensors insulatingly embedded in the die face on the surface in contact with the blades. Limits are determined by the magnitude of the electrical impulse generated.

Use of a stepper motor to control motion of a pelletizer is disclosed is U.S. Pat. No. 4,529,370 wherein the stepper motor controls a gear that interfaces with a first main piston to move the cutter hub in small increments. The gear positions a stopper flange that resists the action of a second piston to pull the main piston with the attached cutter hub toward the die face. As the stepper motor rotates incrementally, the second piston is allowed to draw the main piston to better engage the cutter blades with the die face. Conductivity between the cutter blades and the die face, more specifically, a capacitance bridge circuit, serves as the feedback mechanism to facilitate automation of the stepper motor adjustment.

Control of the movement of the cutter hub and blades as disclosed in U.S. Pat. No. 5,330,340 ("the '340 patent") is achieved by positioning a threaded cylinder containing a shaft through the combination of an incremental drive motor having a gear mechanism oriented transaxially to a second coaxial shaft with gears that intermesh with a main gear circumferentially about the threaded cylinder and to which is attached a compatibly threaded drive thus engaging with and moving the cylinder forward or rearward to adjust the cutter hub and cutter blades against the die face. The '340 patent includes a feedback mechanism that relies on vibration of the cutter blades against the die face, as monitored by a piezoelectric accelerometer. Specific frequencies are identified and subsequently used to monitor proximity of the blades to the die face and adjust accordingly. The cutter hub mechanism as disclosed in the '340 patent works from the upstream or polymer feed side as opposed to similar mechanisms described hereinabove as disclosed in U.S. Pat. No. 4,529,370.

Indexing of the pelletizer utilizing a servo motor is disclosed in U.S. Pat. No. 6,217,802 ("the '802 patent"). The device as disclosed in the '802 patent automatically advances the pelletizer knives a predetermined distance toward the die face on expiration of a predetermined time period. Preferably a set number of equivalent distance advancements are made automatically at those fixed intervals determining the life of the knives. The pelletizer knives are initially calibrated by advancing them toward and against the die face such that the amps measuring the load or resistance generated on the drive motor is within a predetermined range. From this calibration, the number of incremental advancements is determined.

Blade adjustment using a servo motor is also disclosed in U.S. Pat. No. 6,663,372 ("the '372 patent") which monitors the force on the blades in order to make the blade adjustments, ultimately keeping a given amount of force on the blades. Different materials act differently and some require more force than others such that the unit disclosed in the '372 patent would have to be set up for each individual polymer. Adjustment of the position of the cutter hub and cutter blades in relation to the die face is accomplished by controlling the motion of a carriage on which the pelletizer motor is mounted relative to the support frame.

In view of the foregoing, a need exists for a means of adjusting the blades in an underfluid pelletizer that produces highly repeatable results, the adjustment of which can be made manually, at set time intervals, as well as automatically, such that the cutter hub position control device is capable of accommodating and compensating for outside influences on the blades.

SUMMARY OF THE INVENTION

The present invention is directed to a cutter hub position control device for providing axial movement of the cutter hub and blades in relation to the die face of a die plate in order to achieve blade position adjustment in an underfluid pelletizer. The cutter hub position control device communicates with a motion rod at one end that runs through a hollow motor shaft and is attached to a bearing assembly external to the rear of the motor shaft. The front end of the motion rod is connected to a cutter hub holder for axial movement of the cutter hub and cutting blades relative to the motor shaft and die face by a slidable spline drive connection. The hollow motor shaft, motion rod and slidable connection are disclosed in U.S. Pat. No. 7,033,152 ("the '152 patent") which is owned by the assignee of this invention, the disclosure of which is hereby expressly incorporated in this application by reference as if fully set forth herein.

The cutter hub position control device can be controlled with a programmable logic controller (PLC) which produces repeatable results so that adjustments are made consistently every time, without being influenced by and independent of the operator. In addition, a lockable brake can be provided to eliminate any outside influence the transport fluid may have on the blade life. The cutter hub position control device also simplifies control issues through the use of automation as compared with known types of pelletizers without compromising manual control capabilities.

In view of the foregoing, one object of the present invention is provide a pelletizer having a rotary motion cutter hub position control device that adjusts the linear position of a motion rod through a hollow drive shaft of the pelletizer motor such that the cutter hub with attached cutter blades is consistently and reproducibly positioned against a die face to form uniform pellets from an extruded material without being affected by the forces of the molten extrudate, the high rate of flow of the transport fluid, and the rotation of the cutter hub itself.

In another object of the present invention the pelletizer contains a rotary motion cutter hub position control device that is collinear with the motion rod through the pelletizer motor drive shaft.

Still another object of the instant invention is to provide a pelletizer that contains a rotary motion cutter hub position control device that is in a plane parallel to that of the motion rod through the pelletizer motor drive shaft and is drivingly attached to the motion rod.

Another object of the invention is to provide a rotary motion cutter hub position control device in accordance with the preceding objects in which the cutter hub position control device is drivingly attached to the motion rod using a driving mechanism that is drivingly connected to a driven mechanism attached to the motion rod utilizing chains and belts.

Yet another object of the present invention is a cutter hub position control device in accordance with the preceding objects having a driving mechanism and a driven mechanism that can include the use of sheaves, pulleys, and sprockets.

Still another object of the present invention is a cutter hub position control device in accordance with the preceding objects having a belt that is both chemically resistant and slip-resistant.

Another object of the present invention is a cutter hub position control device in accordance with the preceding objects having a belt that can be flat, round, V-shaped, a rotary belt, and a cog belt.

Still yet another object of the present invention is to provide a pelletizer that contains a rotary motion cutter hub position control device that is oriented transaxially to the motion rod through the pelletizer motor drive shaft and is drivingly attached to the motion rod.

Another object of the invention is a rotary motion cutter hub position control device that is transaxial to the motion rod through the pelletizer motor drive shaft and is drivingly attached to the motion rod using a driving mechanism on the motion control device that is drivingly connected to a driven mechanism attached to the motion rod utilizing a belt.

An additional object of the present invention is a rotary motion cutter hub position control device that is transaxial to the motion rod and has a driving mechanism and a driven mechanism that can be at least one of a sheave, a pulley, a sprocket, and a gear.

Another object of the present invention is a rotary motion cutter hub position control device that is transaxial to the motion rod and has a driving mechanism and a driven mechanism that includes at least two gears that can intermesh transaxially as well as in a coplanar fashion.

Still another object of the present invention is a rotary motion cutter hub position control device having a driving mechanism and a driven mechanism that can be at least two gears that can intermesh transaxially as well as in a coplanar fashion and that are drivingly attached to a belt that is preferably chemical and slip resistant.

Another object of the present invention is a rotary motion cutter hub position control device having a driving mechanism and a driven mechanism that is at least two gears that can intermesh transaxially as well as in a coplanar fashion and that are drivingly attached to a belt that can be flat, round, V-shaped, a rotary belt, and a cog belt.

Still yet another object of the invention is to provide a pelletizer that contains a rotary motion cutter hub position control device that is in a plane different than that of the motion control rod allowing a manual control device to be attached collinearly with the motion rod.

Yet another object of the present invention is a rotary motion cutter hub position control device that includes a stepper motor.

Another object of the present invention is a rotary motion cutter hub position control device that includes a microstepper motor.

Still another object of the present invention is a rotary motion cutter hub position control device that includes a servo motor.

In yet another object of the present invention the rotary motion cutter hub position control device includes a servo motor that utilizes combinations of alternating and direct current.

Another object of the present invention is a rotary motion cutter hub position control device that is controlled by feedback systems through a programmable logic controller.

Yet another object of the present invention is a rotary motion cutter hub position control device that is controlled by feedback systems including torque, amperage, linear distance, degrees of rotation, vibration, and/or conductivity.

Still another object of the present invention is a rotary motion cutter hub position control device that receives feedback for an encoder, a resolver, a synchro, a rotary transformer, a Hall device, and/or a tachometer.

Another object of the invention is a rotary motion cutter hub position control device that converts rotary motion to linear motion through a linear screw as well as a linear actuator.

Yet another object of the present invention is a rotary motion cutter hub position control device that converts rotary motion to linear motion through a linear screw that can be a linear ball screw.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 4b is a partial cut-away illustration of a linear ball screw with mounting flange for use in the pelletizer shown in FIG. 4a.

FIG. 4c is a partial cut-away illustration of a linear screw with housing and tension spring for use in the pelletizer shown in FIG. 4a.

FIG. 4d is a partial cut-away illustration of a linear ball screw and housing for use in the pelletizer shown in FIG. 4a.

FIG. 4e is a partial cut-away illustration of a linear screw and housing for use in the pelletizer shown in FIG. 4a.

DETAILED DESCRIPTION OF THE PREFERRED EMBODIMENTS

Figure 1:
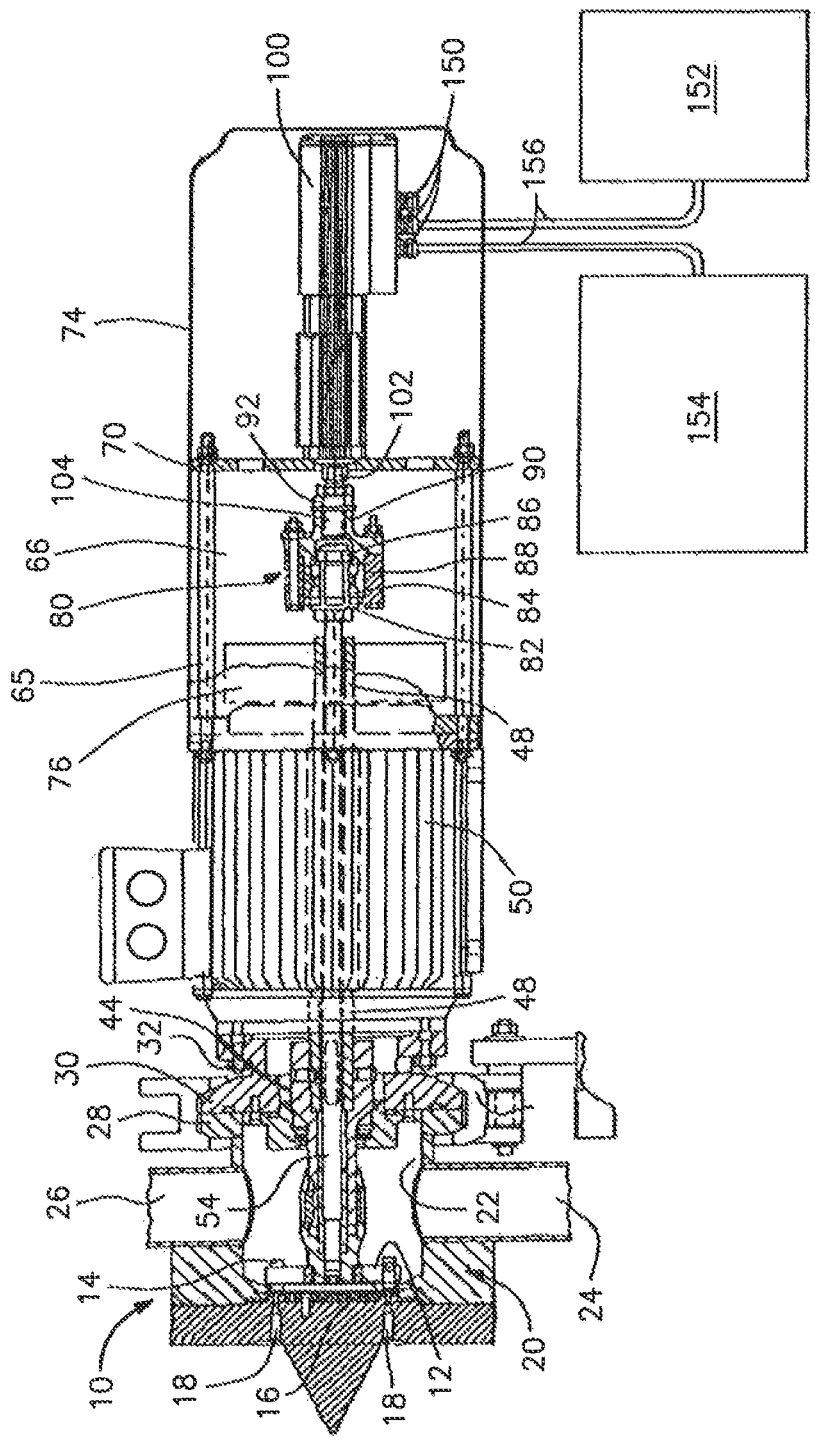
FIG. 1 is an illustration of a collinear cutter hub position control device wherein a pelletizer including a die plate, cutter hub and cutter blades, and transport fluid box.

Although only preferred embodiments of the invention are explained in detail, it is to be understood that the embodiments are given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Most typical pelletizer operations consist of some type of melt processing and feeding equipment, such as an extruder or melt vessel and gear pump, attached to a die plate by an adapter. Additionally other equipment such as a filtering device, a screen changer or candle filter for example, a polymer diverter valve, and other such devices can be utilized between the melting/feeding equipment and the die as are known to be used in the extrusion industry.

Turning now to FIG. 1, an underwater pelletizer with a cutter hub position control device is illustrated in accordance with an embodiment of the present invention. The pelletizer 10 includes a rotatable cutter hub 12 supporting a plurality of cutter blades 14 associated with the die face of a die plate 16 through which molten polymer or other extrudable material is extruded through extrusion orifices 18 in the die plate 16, with the cutter blades 14 cutting the strands exiting the die face into pellets. A transport fluid box generally designated by reference numeral 20 includes a cutting chamber 22 having a transport fluid inlet 24 and transport fluid and pellet slurry outlet 26 in opposed relation to one another. Transport fluid passing through the cutting chamber 22 cools and solidifies the molten plastic or extrudate as the strands are cut into pellets and entrains the pellets into the transport fluid flow for discharge through the outlet 26. The above described structure is a conventional underfluid pelletizer such as that disclosed in the '152 patent. The transport fluid box 20 includes a tapered flange 28 abuttingly engaging a flange 30 mounted on the end of a motor 50 by fastening bolts 32. The flanges 28 and 30 have oppositely slanted peripheral edge portions for engagement by a two-part, channel-shaped clamp 34 to enable assembly and disassembly of the transport fluid box in relation to the motor mounted flange 30 in a conventional manner.

Figure 2:
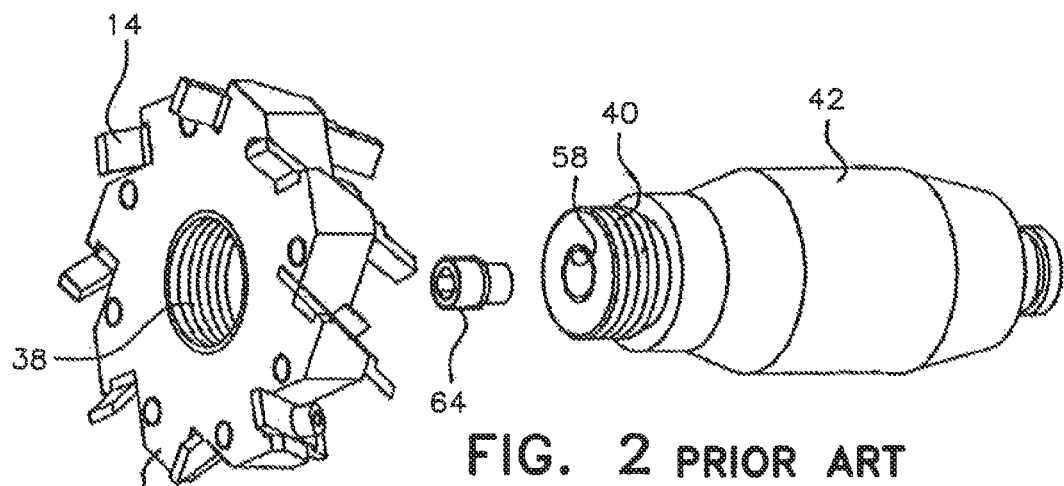
FIG. 2 is a partial perspective illustration of a prior art cutter hub and cutter blades with the cutter hub holder.
Figure 3A:
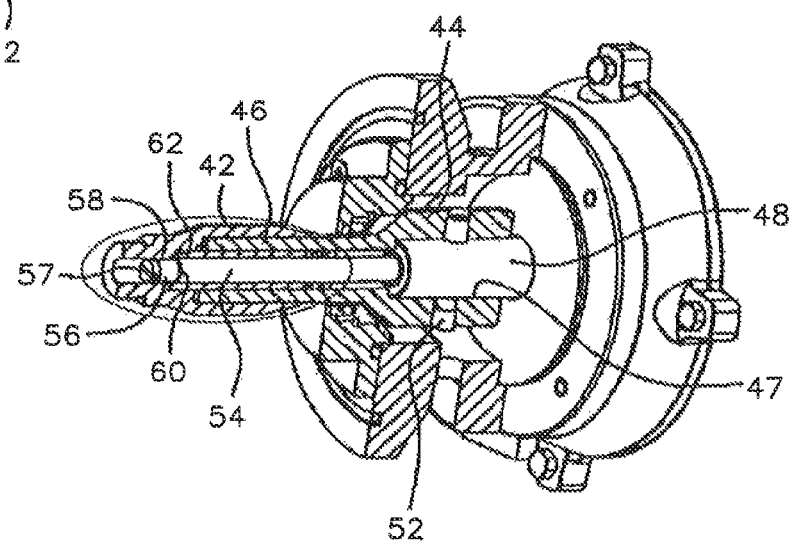
FIG. 3a is a partial cross-sectional illustration of a prior art cutter hub and pelletizer shaft assembly including the motion rod and motor shaft.

As illustrated in FIG. 2, the cutter hub 12 with attached cutter blades 14 includes a centrally disposed internally threaded opening 38 that screw-threadably receives a male threaded, reduced diameter end portion 40 of a cutter hub holder 42. As illustrated in FIG. 3a and further detailed in FIG. 3b, the cutter hub holder 42 is slidingly and drivingly connected to a pelletizer shaft 44 by a slidable spline drive connection 46 in the form of longitudinal grooves and ridges in a manner similar to that disclosed in U.S. Pat. No. 6,332,765 and further referenced in the '152 patent. The pelletizer shaft 44 includes a longitudinal recess 47 of larger diameter than the portion of the pelletizer shaft that engages with the cutter hub holder 42 for receiving a motor shaft 48 that extends through the center of the electric drive motor 50 (FIG. 1). Pelletizer shaft 44 is engagingly attached to motor shaft 48 with at least one set screw 52 to facilitate synchronous co-rotation of the pelletizer shaft 44 and motor shaft 48 about motion rod 54.

Figure 3B:
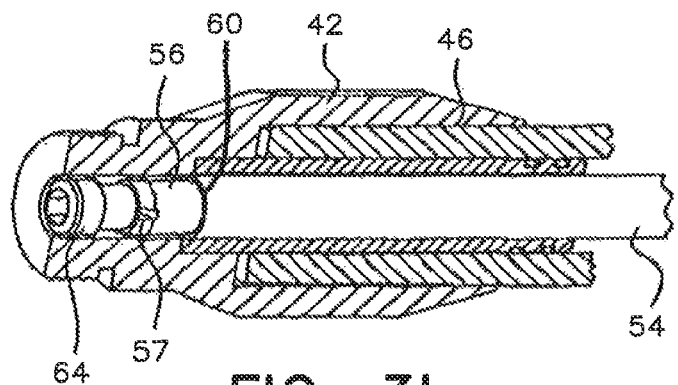
FIG. 3b is an expanded view of the cross-sectional illustration in FIG. 3a showing detail of the cutter hub assembly and motion rod components.

As illustrated in FIGS. 1, 3a, and 3b, the motor shaft 48 is hollow and includes an elongated one piece motion rod 54 extending completely through the motor shaft 48 and the motor 50. Interior to motor shaft 48 and concentrically about motion rod 54 is a linear bearing (not shown) to facilitate free and unrestricted linear movement of motion rod 54. The motion rod 54 includes a reduced diameter threaded end 56 that is screw threadedly engaged with an internally threaded end portion 58 of the cutter hub holder 42. The reduced end 56 of motion rod 54 has a screw-driver-receiving kerf 57 therein to enable assembly and disassembly of motion rod 54 and cutter hub holder 42. The reduced threaded end 56 on rod 54 also defines a shoulder 60 that abuts an inner shoulder 62 at the inner end of the internally threaded portion 58 of the end of the cutter hub holder 42 to thereby screw-threadedly connect the threaded end 56 of the motion rod 54 to the interior of the cutter hub holder 42. A lock screw 64 is threaded into the internally threaded end portion 58 of the cutter hub holder 42 into abutting engagement with the end of the motion rod 54 to provide a locking action between the external threads on the motion rod 54 and the internal threads 58 in the end of the cutter hub holder 42. The cutter hub holder 42 is threaded into the cutter hub 12 by external threads 40 which engage the internal threads 38 in the cutter hub 12.

The spline coupling 46 enables the cutter hub holder 42 to elongate or shorten as determined by movement of the motion rod 54. The lock screw 64 enables assembly and disassembly of the cutter hub holder 42 from the motion rod 54 and locks the cutter hub holder 42 and cutter hub 12 fixedly but detachably to the motion rod 54.

Returning to FIG. 1, the motor 50 includes a housing extension 66 that is supported from the motor 50 by elongated bolts 65. Housing extension 66 is closed at its distal end by an end plate 70 that supports a collinear cutter hub position control device 100 outwardly thereof, preferably within a rear enclosure 74. Within housing extension 66, a motor fan 76 is attachedly connected to motor shaft 48 through which passes motion rod 54. Circumferentially about motion rod 54 and internal to hollow motor shaft 48 is an additional linear bearing (not shown).

Motion rod 54 extending through the motor shaft 48 is provided with a bearing assembly 80 in the interior of the housing extension 66. Motion rod 54 extends into and through a bearing sleeve 82 to which the rod 54 is internally and threadingly attached at its distal end. Concentrically and circumferentially about bearing sleeve 82 is thrust bearing 84. A bearing nut 86, threadingly attached externally to bearing sleeve 82, maintains the thrust bearing positionally. Enclosing the thrust bearing 84 is a bearing housing 88 to which a bearing cover 90 is boltingly attached. The positioning shaft 102 of cutter hub position control device 100 has a threaded terminal portion 104 that is threadingly attached internally within the bearing cover 90. A lock nut 92 is threadingly attached externally to bearing cover 90.

The present invention preferably includes at least one communication port 150, with three being shown in FIG. 1 without intending to be limited thereby. At least one of a power source 152, a programmable logic control device 154 or "PLC", and input/output devices or "I/O devices" as discussed herein below may be attached to the communication ports 150. Attachment cables 156 attach directly to the respective communication ports 150 and pass through openings in the rear enclosure 74 as needed. Other arrangements in positioning of the various devices are possible as is known to those skilled in the art and the arrangement as shown herein is intended to be for purposes of illustration and clarity without intending to be limiting.

Figure 4A:
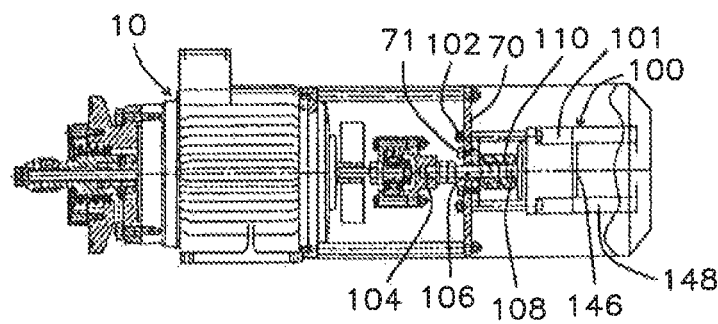
FIG. 4a is a cross-sectional illustration of a pelletizer with a cutter hub position control device including a linear screw in accordance with the present invention.

Pelletizer 10 as shown in FIG. 4a includes the collinear cutter hub position control device 100 boltingly attached to the end plate 70 which contains a spindle nut 71 through which the spindle 106 passes. The positioning shaft 102 consists of the spindle 106 that is fixed on one side inside the bearing housing 80 via screw thread 104, and on the other side is fixed to one end of a linear flexible coupling 110. On the other side of the linear flexible coupling is connected the splined drive shaft 108 of gearbox 101 that is directly connected to motor 146 that is contained within motion control housing 148.

Conventional linear screws including backlash components of any design can be used in accordance with the instant invention as is understood by one skilled in the art. Without intending to be limited, linear screws can include bearing screws 112 with a mounting flange 114 (FIG. 4b) or with housing 116 (FIG. 4d). Alternatively the linear screws can include a threaded screw 118 (FIGS. 4c and 4e) in housing 120 about which is circumferentially placed tension spring 122 (FIG. 4c). The linear screw can also include a threaded screw 118 in housing 124 (FIG. 4e) preferably comprising a gall-resistant material, most preferably brass. Backlash components, without intending to be bound by any theory, work to reduce or eliminate any freedom of movement between the threads of the screw and the complementary threads internal to the respective housing components to insure the control, accuracy, and reproducibility of the adjustments being made by the cutter hub position control device.

Figure 4B:
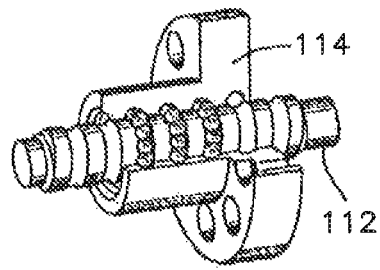
Figure 4C:
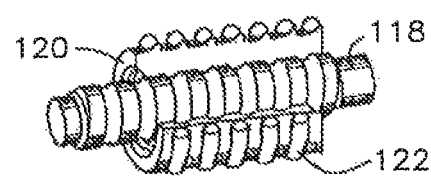
Figure 4D:
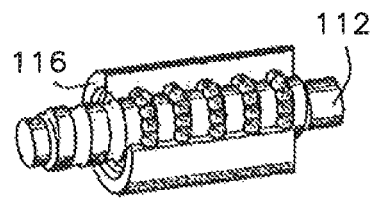
Figure 4E:
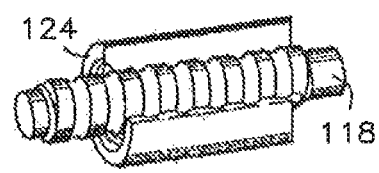
Figure 4F:
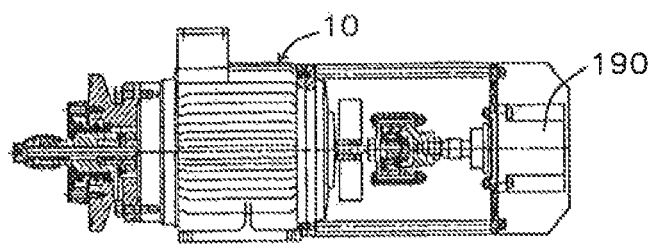
FIG. 4f is a cross-sectional illustration of a collinear integrated pelletizer and cutter hub position control device in accordance with the present invention.

FIG. 4f illustrates an alternative embodiment of the present invention in which pelletizer 10 includes an integrated cutter hub position control device 190 in which the linear screw component is integrated into the body of the cutter hub position control device as described hereinabove.

In consideration of larger pelletizers, the housing extension 66 of the pelletizer 10 in FIG. 1 can become of sufficient size that proper cooling of the volume within the housing extension by motor fan 76 can become problematic. With increase in size comes additional concern as to proper positioning of the linear bearings and supports to insure no flexure of the shafts is occurring between the supports or external to the supports. Size alone can prove prohibitive when space limitations are an issue.

Figure 5:
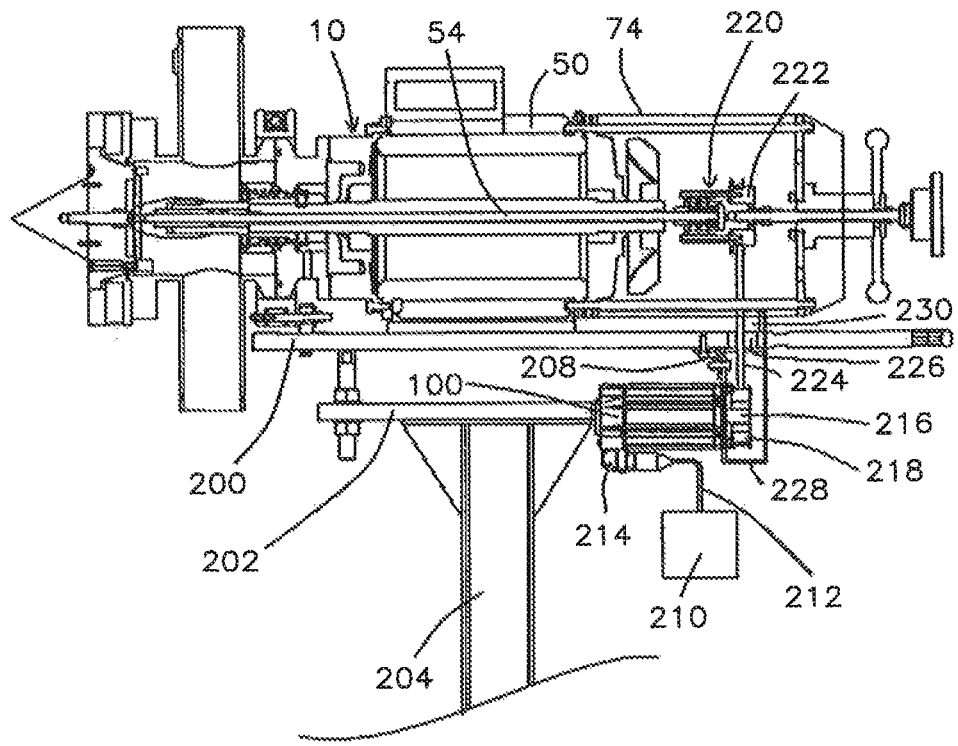
FIG. 5 is a cross-sectional illustration of a pelletizer with the cutter hub position control device in parallel orientation relative to the pelletizer.
Figure 6:
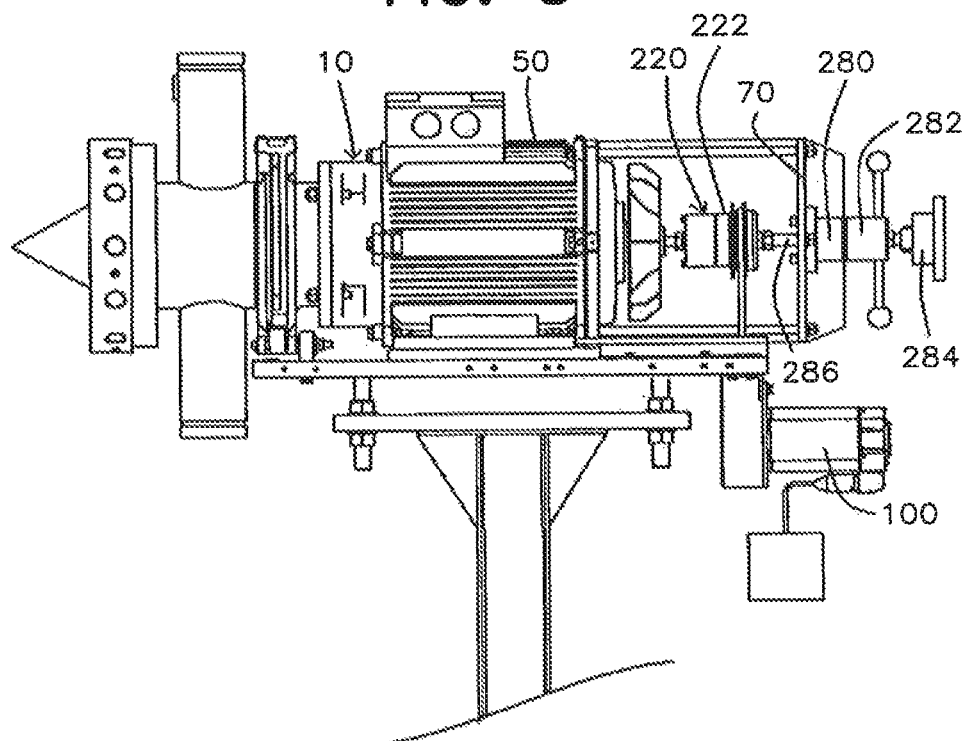
FIG. 6 is a cross-sectional illustration of a pelletizer with the cutter hub position control device in an alternative orientation relative to the pelletizer shown in FIG. 5.

With such size consideration, an additional embodiment of the invention is illustrated in FIGS. 5 and 6 wherein the cutter hub position control device has been relocated to a plane parallel to that of the motor shaft. FIG. 5 and FIG. 6 differ only in the orientation of the cutter hub position control device relative to that of the motor. For purposes of illustration and without intending to be limited, the cutter hub position control device can include either the cutter hub position control device 100 or the integrated cutter hub position control device 190 and is represented hereinbelow as cutter hub position control device 100.

Turning now to FIG. 5, pelletizer 10 is fixedly attached to pelletizer baseplate 200 that subsequently is boltingly attached to baseplate 202. Baseplate 202 is fixedly attached, preferably by bolting, to support 204. Cutter hub position control device 100 is fixedly attached to angular bracket 208 and subsequently mounted fixedly to pelletizer baseplate 200. At least one auxiliary device 210 is connected by cable 212 to connection 214 on the cutter hub position control device. The auxiliary device 210 can include at least one of I/O devices, power sources, and programmable logic controllers.

The support 204 can be vertically below the pelletizer, such as a stand, as well as vertically above and therefore suspending the pelletizer 10. The axis of the cutter hub position control device positioning shaft 216 is parallel to the motion rod 54 that extends into and through motor 50. Driving device 218 is threadingly attached to the threaded end of the positioning shaft 216. The driving device 218 may be embodied as a sheave, a pulley, a sprocket, or other equivalent device using attachment mechanisms as are known to those skilled in the art. Similarly, bearing assembly 220 can have an equivalent driven device attached to the bearing cover and preferably can be a driven-device modified bearing cover 222. A drive connector 224 connects driving device 218 to driven-device modified bearing cover 222 and can be a chain or a belt including flat belts, round belts, V-belts, rotary belts or chain belts, cog belts or timing belts, and the like. Cog belts are preferred for use to avoid any undesirable slip or backlash between the driving and driven mechanisms. More preferably the cog belt is not prone to slip and is chemically resistant with minimum stretch or distension on regular use. Most preferably the cog belt provides reproducible translation of motion from the driving mechanism to the driven mechanism at slow speeds under high torque loading without slip and without distension. Drive connector 224 passes through an opening 226 in the pelletizer baseplate 200. Driving device 218 and the lower portion of drive connector 224 are enclosed in housing 228 that can be attached to at least one of the cutter hub position control device 100, angular bracket 208, and the pelletizer baseplate 200. A safety skirt 230 is attached to at least one of the top surface of the pelletizer baseplate 200 and the rear enclosure 74 to ensure dust-free operation and to prevent accidental injury to the operator.

Figure 7A:
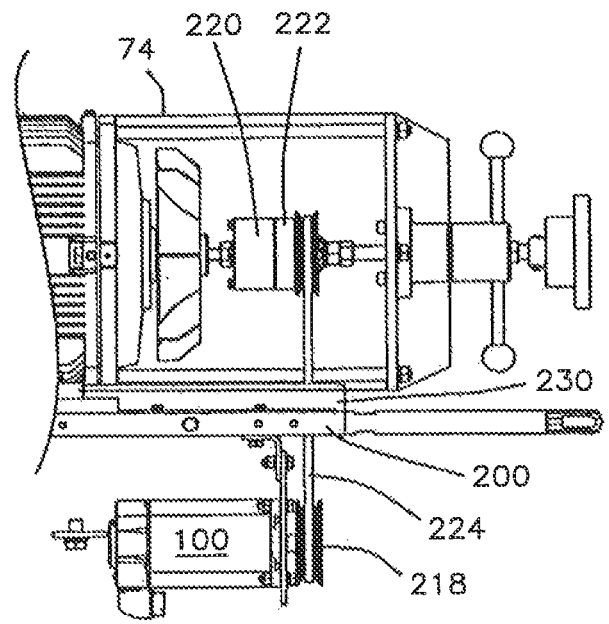
FIG. 7a is a partial detailed cross-sectional illustration of a pelletizer with cutter hub position control device as configured in FIG. 5.
Figure 7B:
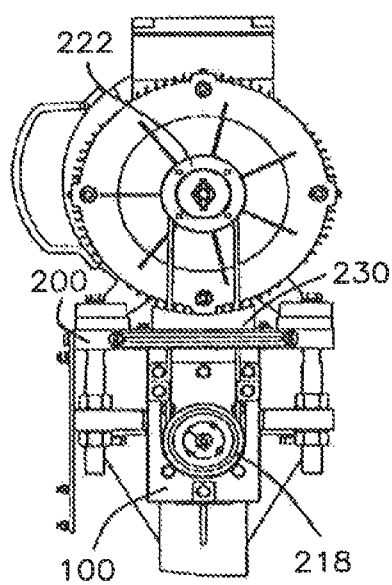
FIG. 7b is a horizontal cross-sectional view of the pelletizer shown in FIG. 7a along a plane cut through the driving mechanism and driven mechanism.
Figure 7C:
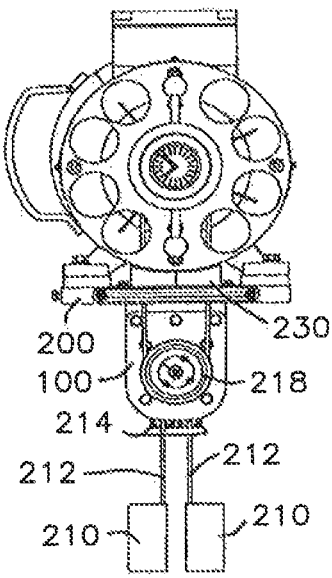
FIG. 7c is a horizontal cross-sectional view of the pelletizer shown in FIG. 7a along a plane cut through the auxiliary devices and connectors on the cutter hub position control device.

FIG. 7a further illustrates the driving and driven mechanisms as detailed hereinabove. The cutter hub position control device 100 is fitted with driving device 218 that is connected through use of a drive connector 224 to the driven-device modified bearing cover 222. Drive connector 224 passes through an opening (not shown) in pelletizer baseplate 200 as well as through safety skirt 230. FIG. 7b similarly illustrates this configuration in transverse cross-section. FIG. 7c is a transverse cross-section further illustrating the at least one, and preferably at least two communication ports 214 attached to cutter hub position control device 100. The at least one, and preferably at least two auxiliary devices 210 are connected by respective cables 212 to communication ports 214 on the cutter hub position control device. The auxiliary devices can include at least one of I/O devices, power sources, and programmable logic controllers as aforementioned. For purposes of illustration two such auxiliary devices and respective connections are illustrated without intending to be limited.

Figure 8:
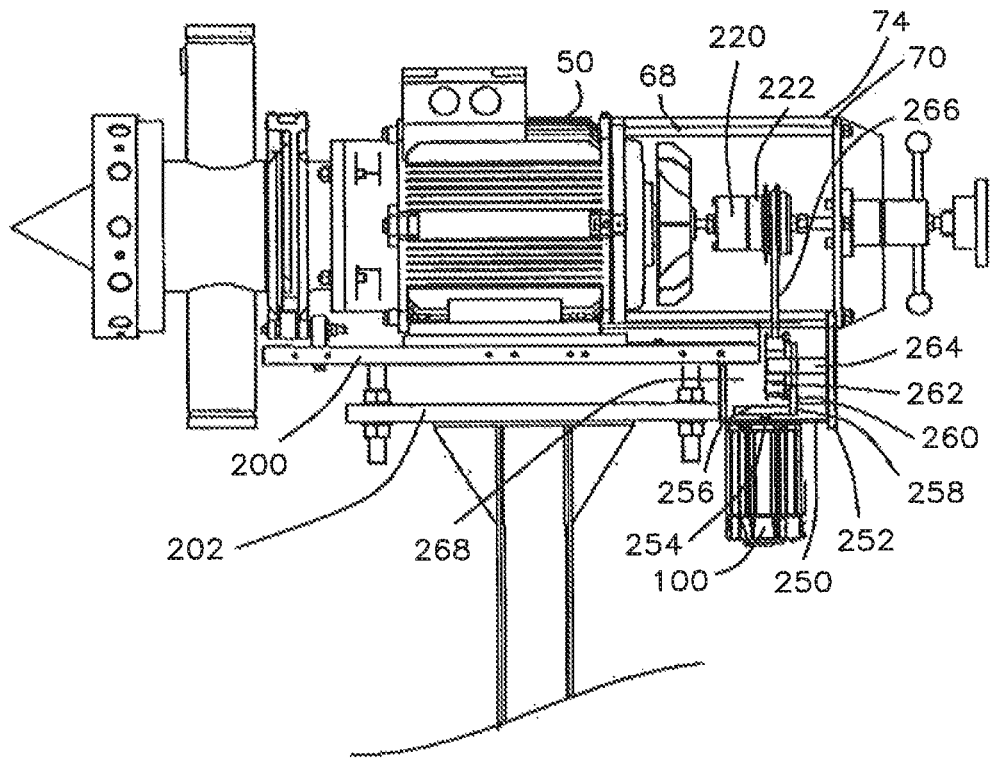
FIG. 8 is a cross-sectional illustration of a pelletizer with the cutter hub position control device transaxial to the pelletizer and including intermeshing gears to control the driving mechanism.
Figure 9:
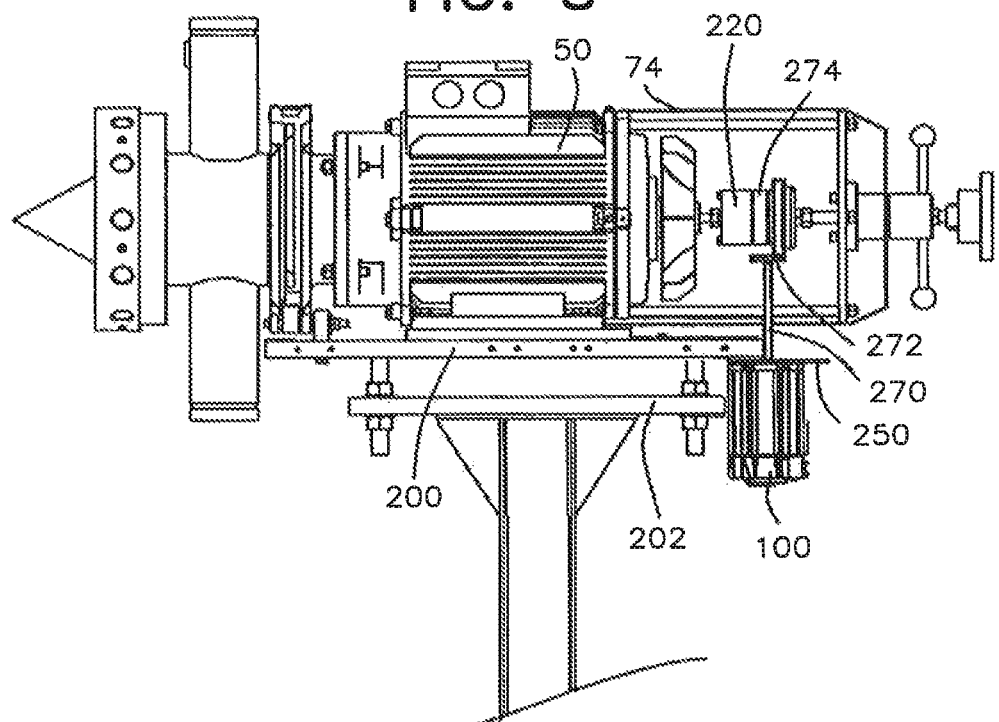
FIG. 9 is a cross-sectional illustration of a pelletizer with an alternative arrangement relative to FIG. 8 in which the cutter hub position control device is transaxial to the pelletizer with intermeshing gears to control the driven mechanism.

FIGS. 8 and 9 illustrate the cutter hub position control device 100 in transaxial orientation relative to the axis of orientation of motor 50. As illustrated in FIG. 8 and without intending to be limited, cutter hub position control device 100 is boltingly attached to baseplate 200 with bracket 250. Bracket 252 is boltingly attached with end plate 70 utilizing elongated bolt 68. Positioning shaft 254 of cutter hub position control device 100 is fixedly attached to drive gear 256 that intermeshes in transaxial orientation with gear 258 fixedly attached on axis 260 which freely rotates in a bearing (not shown) in bracket 252. Gear 258 intermeshes in coplanar orientation with a gear component of driving device 262 fixedly attached to axis 264. Axis 264 freely rotates in a bearing (not shown) in bracket 252. Driving device 262 is connected through drive connector 266 to a driven-device modified bearing cover 222 on bearing assembly 220. The assemblage of gears is enclosed in housing 268 attachedly connected to at least one of the baseplate 202, the pelletizer baseplate 200, and the rear enclosure 74. The ratio of the gears can be the same or different.

Similarly in FIG. 9, cutter hub position control device 100 with positioning shaft 270 passes through an opening (not shown) in rear enclosure 74. Attachedly connected to positioning shaft 270 is drive gear 272 that intermeshes in transaxial orientation with a gear component of a driven gear-modified bearing cover 274 attached to bearing assembly 220. As illustrated in FIG. 9 and without intending to be limited, cutter hub position control device 100 is boltingly attached to baseplate 202 with bracket 250. The ratios of the gears can be the same or different.

By virtue of moving the cutter hub position control device 100 outside of the rear enclosure 74, (FIGS. 5, 6, 7a-7c, 8, and 9) an advantage is realized in that conventional manual control of the pelletizer can be retained in addition to control by the cutter hub position control device. For sake of clarity, components have been identified only in FIG. 6 and it is understood that respective components as illustrated in the collective FIGS. 5, 6, 7*a*-7*c*, 8, and 9 are similarly identified.

In FIG. 6, flange 280, preferably made of brass, is boltingly attached to end plate 70. Threadingly attached to flange 280 is a jam nut with handles 282 that serves as an interlocking device for manual adjustment device 284. To operate manually, the jam nut with handles 282 is manually loosened by rotation such that manual adjustment device 284 can now be rotated to collinearly move positioning shaft 286 inwardly or outwardly as needed. Positioning shaft 286 has a threaded terminus (not shown) that is threadingly attached to the driven-device modified bearing cover 222 (FIGS. 5, 6, 7*a*, 7*b*, and 8) or to the driven gear-modified bearing cover 274 (FIG. 9) and is threaded at least in the portion that rotatably moves through flange 280. The driving and driven devices can be the same or different dimensionally, facilitating the optimization of ratios to control the rotational to linear motion.

The cutter hub position control device 100 associated with FIGS. 1, 4*a*, 5, 6, 7*a*, 7*b*, 7*c*, 8, and 9 can be any motor-driven device capable of rotating slowly under torque to yield highly controllable positioning. As such the cutter hub position control device 100 can be a stepper motor, a servo motor and, for extremely fine control, may be a piezoelectric motor. Stepper motors can be variable reluctance, permanent magnet, and hybrid types in which the motor windings can be either uni- or bi-filar. It can perform full, half, or micro steps and preferably would be a microstepper motor. Control of the stepper motor includes a step motor driver that can be unipolar, resistance limited, or bipolar chopper. The indexing capabilities can be stand-alone operations or under integrated control.

The servo motor can be alternating current, direct current, and combinations thereof. Preferably the servo motor converts alternating current to direct current for responsiveness and then completes the cycle through alternating current.

As illustrated above, the cutter hub position control device 100 can operate collinearly as in FIGS. 1, 4*a*, and 4*b*; in parallel axes as in FIGS. 5, 6, and 7*a*, 7*b*, and 7*c*; and transaxially as in FIGS. 8 and 9. The mechanism of collinear action results in conversion of the rotary motion of the cutter hub position control device 100 into linear action through use of the linear screw and comparable linear actuators as are known to those skilled in the arts. For parallel axis operations, the rotary motion of the cutter hub position control device 100 is transferred as rotary motion to the bearing assembly 220 that is converted to linear motion as the threaded portion of positioning shaft 286 (FIG. 6) in the flange 280 is rotated. In transaxial operations, the rotary motion of the cutter hub position control device 100 is transferred perpendicularly to rotate the bearing assembly 220 and subsequently converted to linear motion as the threaded portion of positioning shaft 254 (FIG. 8) and drive gear 256 are rotated. In manual operation, the rotary motion of the manual adjustment device 284 is similarly converted to linear movement through positioning shaft 286 as above.

Feedback mechanisms provide the necessary input to make minor adjustments automatically such that the cutter hub position control device 100 rotates to generate sufficient linear motion to ultimately move the motion rod 54 the distance necessary to bring the feedback into the range of tolerance. Feedback mechanisms can include at least one of drive motor torque or amperage, cutter hub position control device torque or amperage, linear distance moved, degree of rotation, conductivity between the cutter blades and the die face, vibrational energy, velocity of the rotation, and combinations thereof as is known to those skilled in the art. Feedback input can be obtained through conventional use of Hall devices, tachometers, resolvers, rotary encoders, linear encoders, synchros, rotary transformers, and the like. Interpretation can be achieved through programmable logic control utilizing proportion-integration-derivative or "PID" considerations, through use of proportion-integration-velocity or "PIV" considerations, as well as through use proportion-derivative-velocity or "PDV" considerations and the like as is known to those skilled in the art.

Operation of the pelletizer 10 as equipped with the cutter hub position control device typically involves the processes of (1) homing orientation and the setting of feedback lower limit (FIG. 10), (2) blade seating and the setting of feedback upper limit (FIG. 11), (3) automatic run operation (FIG. 12), (4) and manual control.

Figure 10:
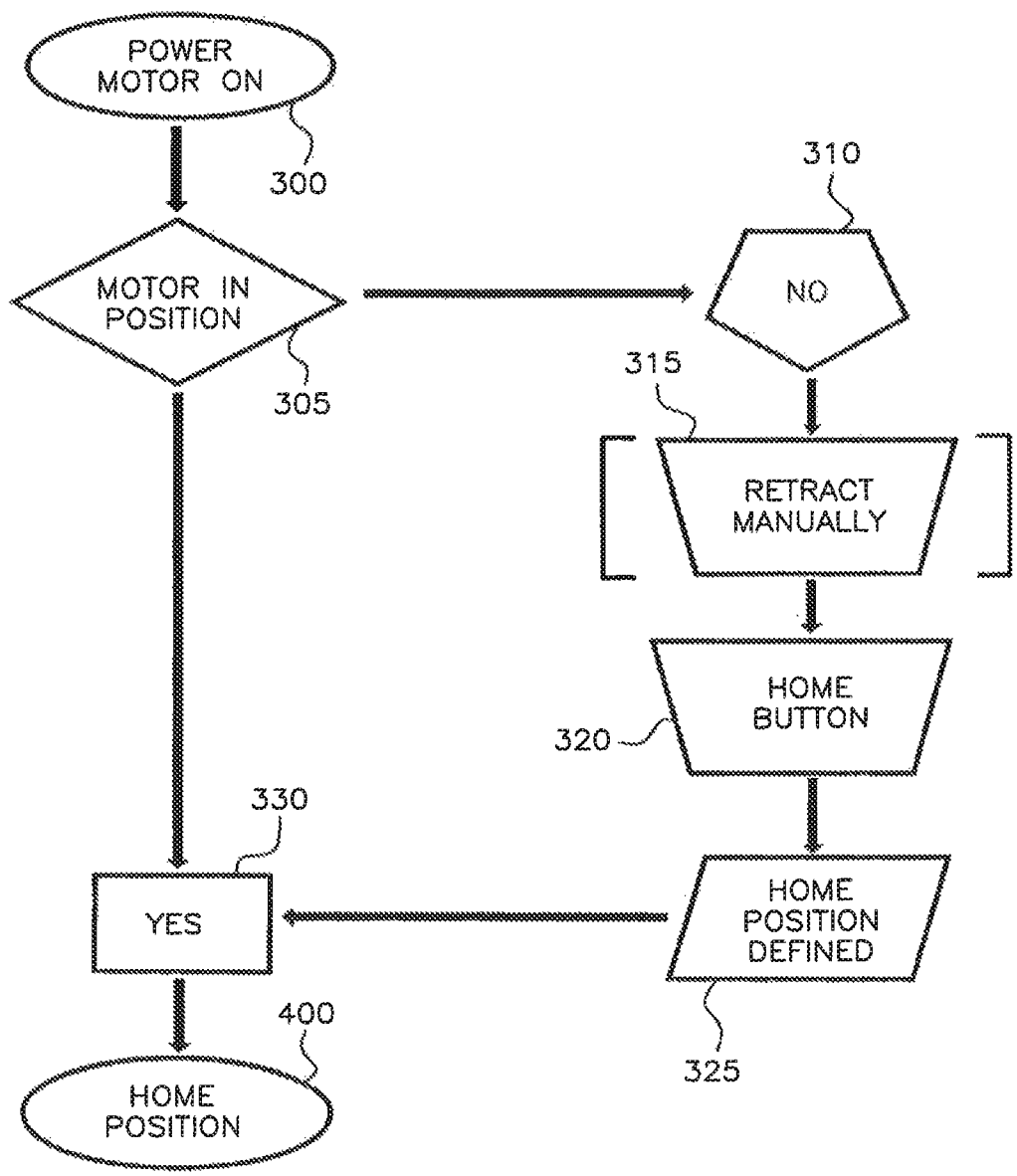
FIG. 10 is a flow chart of the cutter hub position control device homing sequence.

The homing process essentially moves the cutter hub away from the die to a fixed home position. FIG. 10 illustrates the sequence of events. To start, the motor is turned on, MOTOR POWER ON 300. Knowledge of the position of the motion rod is the determinant as to whether the cutter hub is either in the fully retracted, or otherwise defined, home position MOTOR IN POSITION 305, or needs to be retracted to the home position. If the cutter hub is in the home position, YES 330, the homing process is complete. If the cutter hub is not in the home position, NO 310, then the motion rod is moved backward manually, RETRACT MANUALLY 315, when possible or mechanically when the operator depresses the HOME BUTTON 320. The motion rod is withdrawn at a specified rate over a particular interval of time when the process is automated. The most retracted position is defined as the lower limit set point, HOME POSITION DEFINED 325, such that the motor now knows its position is at home, YES 330. Essentially, the motor is free from any torque or amperage draw in this HOME POSITION 400.

Figure 11:
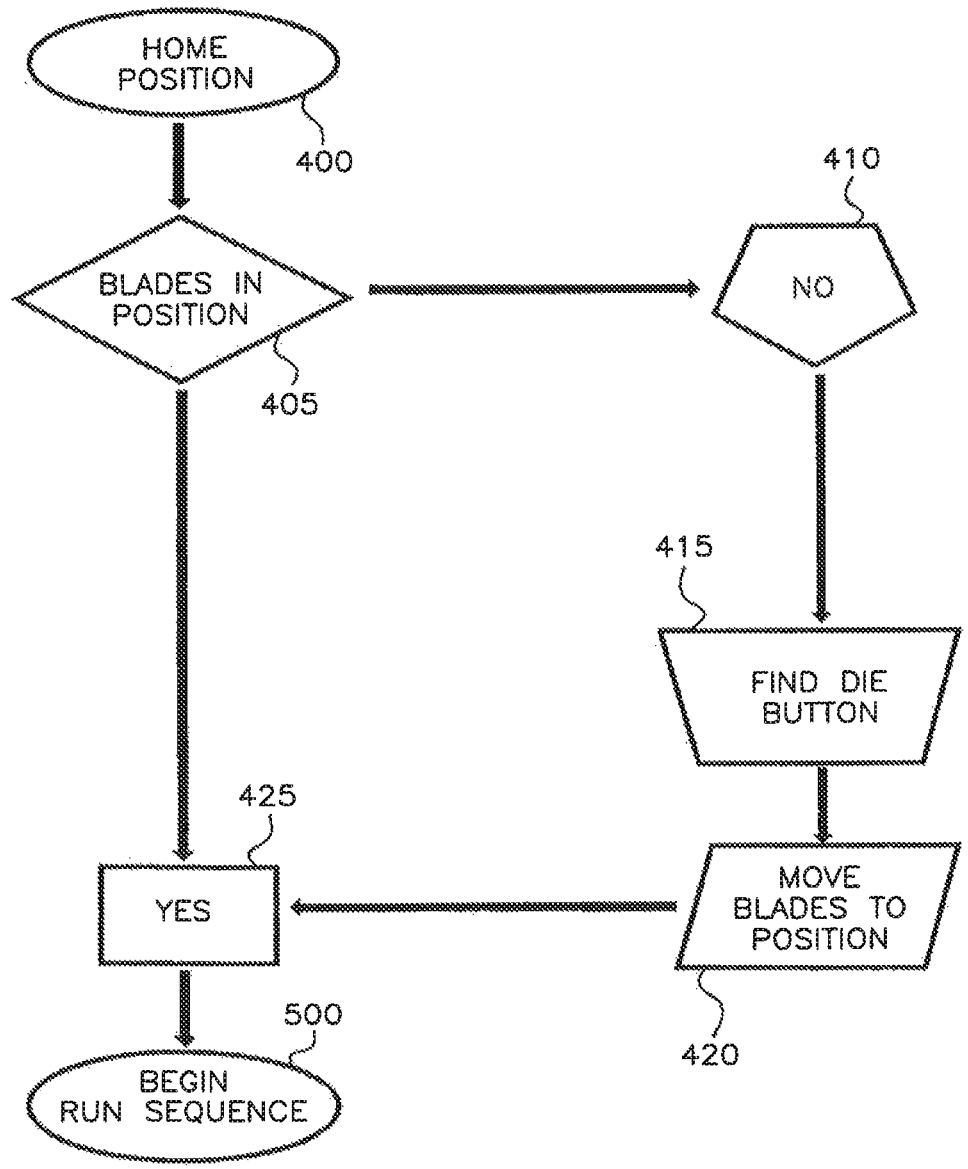
FIG. 11 is a flow chart of the cutter hub position control device blade position sequence.

From the HOME POSITION 400 in FIG. 11, the cutter hub position control device now seeks the location of the die, with or without the transport fluid actively passing across the heated die surface. The determinant for this is if the motion rod has moved the cutter hub against the face of the die to a maximum limit to reach BLADES IN POSITION 405. If the blades are in position, YES 425, the system is ready to run, BEGIN RUN SEQUENCE 500. If the blades are not in position, NO 410, then on depression of the FIND DIE BUTTON 415, the cutter hub position control device moves the motion rod to position the cutter hub and blades against the die face, MOVE BLADES TO POSITION 420, thereby defining the maximum limit set point. At the maximum limit set point, the motion rod has moved the cutter hub against the face of the die to the maximum limit, reaching YES 425. Once YES 425 is reached, the system is ready to run automatically, BEGIN RUN SEQUENCE 500.

Figure 12:
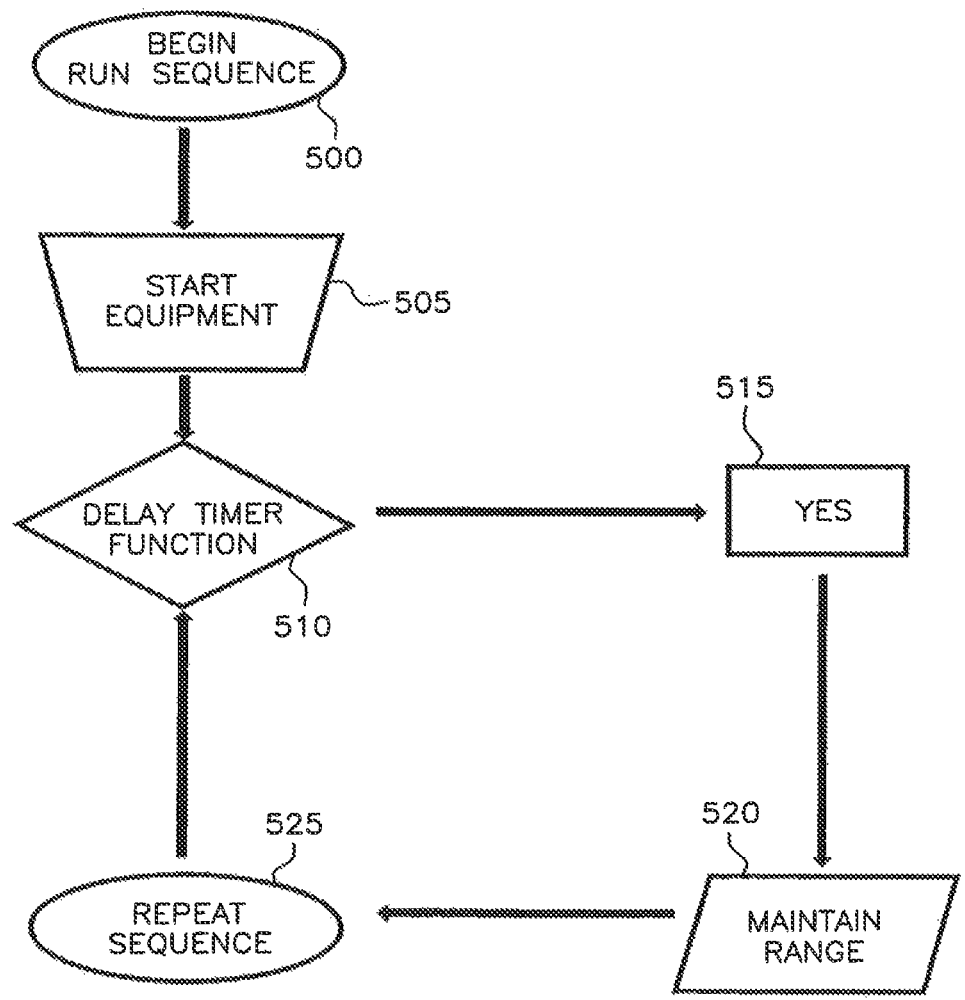
FIG. 12 is a flow chart of the cutter hub position control device running sequence.

Turning now to FIG. 12, with BEGIN RUN SEQUENCE 500 the equipment is started, START EQUIPMENT 505, and a delay timer is activated, DELAY TIMER FUNCTION 510, which sets an appropriate time for adjustment. On reaching the appropriate time, YES 515, the cutter hub position control device adjusts the motion rod to maintain the position of the cutter hub and cutter blades against the die face such that a determined range within the feedback mechanism is maintained, MAINTAIN RANGE 520. Once within range, the delay timer is once again initiated, REPEAT SEQUENCE 525, until the determinant delay time, set by DELAY TIMER FUNCTION 510, once again reaches the limit, after which the cycle of adjustment at YES 515 followed by MAINTAIN RANGE 520 is repeated.

Using motor torque or amperage as an example without intending to be limited, a typical pelletization process can utilize from about 10-90% of the available power from a motor. Typically a lubricious material may utilize about 20-40%, for example, whereas an aggressive material, highly viscous material, or highly filled material may need about 80% of the available power. For most materials and by way of example, torque readings of about 30-60% are reasonable and as such this would be set as the operating range for a process. Once the operating torque is outside the 30-60% range the cutter hub position control device moves the motion rod toward the die face to increase the torque to at least 30% or withdraw the motion rod to drop the torque to 60% or less. Additionally the cutter hub position control device can be controlled to make these adjustments by moving the motion rod at a specific velocity. The delay times determine how frequently feedback mechanisms are invoked and thus determine the frequency of the adjustments.

Alternatively, the cutter hub position control device, knowing its minimum and maximum set points, can subdivide the distance traveled between these points and can be moved over this distance at fixed increments or incrementally at fixed time intervals, for example, to maintain the desired range within the defined limits. The distance moved by the external shaft in extending and retracting to move the blades can be programmed so that the shaft moves the same distance every time a blade adjustment is required. Given that the usable blade life is known, and the blade adjustment and increment are parameters that would also be known, the optimal time between blade changes can be predetermined to aid in planning production runs and estimating down time. Other feedback mechanisms known to those skilled in the art and detailed hereinabove can be utilized in comparable fashion to achieve process control.

When compared to a hydraulically adjusted pelletizer, the cutter hub position control device according to the present invention has fewer wear parts, which translates to lower maintenance costs for the user. In addition, many underwater pelletizing systems already use a PLC to control the complete system so, in most current systems the PLC is already present and can be used for the cutter hub position control device with minimal modifications.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. An underwater pelletizer for extruding a polymer through an extrusion die having a cutting face comprising:
    a cutting chamber with transport fluid flowing therethrough for receiving extruded polymer;
    a cutter hub with attached cutting blades driven by a hollow drive shaft having a motion control rod passing therethrough, said cutter hub and cutting blades being positioned against said cutting face;
    a position control device for said cutter hub operatively coupled to said motion control rod for linearly moving said motion control rod within said drive shaft to position the cutter hub and cutting blades axially toward and away from the cutting face of the die;
    a first feedback mechanism configured to output data relating to pelletizer motor load amperes;
    a second feedback mechanism configured to output data relating to a linear distance between the cutter hub and the cutting face of the die; and
    a controller configured to receive an input from said first and second feedback mechanisms during operation of said pelletizer and to interpret said input to provide automated feedback to said cutter hub position control device to move the motion control rod toward and away from the cutting face to adjust the position of the cutter hub and cutting blades by a distance determined using the feedback mechanism input such that the cutter hub with attached cutting blades is adjusted during pelletizer operation to remain within a desired operating range with respect to the cutting face.

2. The pelletizer according to claim 1 wherein the cutter hub position control device is collinear with the motion control rod through the hollow drive shaft.

3. The pelletizer according to claim 1 wherein a longitudinal axis of the cutter hub position control device is in a plane parallel to that of the motion control rod through the hollow drive shaft, said position control device being drivingly attached to the motion control rod.

4. The pelletizer according to claim 3, wherein the cutter hub position control device is drivingly attached to the motion control rod using a driving mechanism of said cutter hub position control device that is drivingly connected to a driven mechanism attached to the motion control rod utilizing at least one of a chain and a belt.

5. The pelletizer according to claim 1 wherein the cutter hub position control device is in a plane different from that of the motion control rod and further comprising a manual control device attached collinearly with the motion control rod.

6. The pelletizer according to claim 1 wherein the cutter hub position control device includes a stepper motor, a microstepper motor or a servo motor.

7. The pelletizer according to claim 1 wherein said controller includes a programmable logic controller.

8. The pelletizer according to claim 7 wherein the cutter hub position control device also receives feedback relating to at least one of torque, degrees of rotation, vibration, and conductivity.

9. A method of controlling cutter blades relative to the cutting face of a die plate in an underwater pelletizer having a cutter hub and blades coupled to a motor-driven hollow drive shaft through which a motion control rod extends, said motion control rod being linearly movable within said motor-driven hollow drive shaft to move the cutter hub and blades axially toward and away from the cutting face of the die plate, said method comprising the steps of:
    moving the cutter hub away from the die plate to a first position based upon a position of the motion control rod, said first position defining a home position and a feedback lower limit;
    moving the cutter hub toward the die plate to a second position using the motion control rod until the blades are against the die face, said second position defining a starting position;
    operating the pelletizer;
    invoking at least one feedback mechanism using a controller to provide automated feedback to a cutter hub position control device during operation of the pelletizer, said automated feedback including data relating to pelletizer motor load amperes and linear distance moved by the motion control rod; and adjusting a position of the cutter hub and blades based on said automated feedback, said step of adjusting including moving the motion control rod and cutter hub toward and away from the cutting face by a linear distance determined from the automated feedback to maintain the pelletizer motor load amperes within a desired operating range that is reached when the cutter hub and blades are properly distanced from the die plate for pelletizer operation.

10. The method as set forth in claim 9, further comprising the step of setting a time period defining how frequently the position of the cutter hub is adjusted relative to the die plate in order to determine a next starting position for the cutter hub.

11. The method as set forth in claim 9, wherein the steps of moving the cutter hub away and toward the die plate include using a cutter hub position control device that is collinear with the motion control rod through the motor-driven hollow drive shaft.

12. The method as set forth in claim 9, wherein the steps of moving the cutter hub away and toward the die plate include using a stepper motor, a microstepper motor or a servo motor as a cutter hub position control device.

13. The method as set forth in claim 9, wherein the step of invoking a feedback mechanism further includes using the controller to provide automated feedback to a cutter hub position control device based on at least one parameter selected from the group consisting of forces of the extruded polymer, transport fluid flow rate, and rotation of the cutter hub itself.

14. The method as set forth in claim 9, further comprising the step of providing additional feedback to a cutter hub position control device relating to at least one of torque, degrees of rotation, vibration, and conductivity.

15. The method as set forth in claim 9, wherein the steps of moving the cutter hub away and toward the die plate include using a cutter hub position control device having a longitudinal axis that is in a plane parallel to that of the motion control rod through the motor-driven hollow drive shaft, said position control device being drivingly attached to the motion control rod utilizing at least one of a chain and a belt.

16. The method as set forth in claim 9, wherein the steps of moving the cutter hub away and toward the die plate include using a cutter hub position control device having a longitudinal axis that is transaxial to the motion control rod and the motor-driven hollow drive shaft and is drivingly attached to the motion control rod.

17. A method of controlling a position of cutter blades relative to the cutting face of a die plate in an underwater pelletizer having a cutter hub and blades coupled to a motor-driven hollow drive shaft through which a motion control rod extends, said motion control rod being linearly movable within said motor-driven hollow drive shaft to move the cutter hub and blades axially toward and away from the cutting face of the die plate, said method comprising:

providing an underwater pelletizer with the cutter hub and blades coupled to a motor-driven hollow drive shaft through which a motion control rod extends, said motion control rod being linearly movable within said motor-driven hollow drive shaft to move the cutter hub and blades axially toward and away from the cutting face of the die plate, said pelletizer having a cutter hub position control device that is collinear with the motion control rod through the motor-driven hollow drive shaft;

moving the cutter hub away from the die plate to a first position based upon a position of the motion control rod, said first position defining a home position;

moving the cutter hub toward the die plate to a second position using the motion control rod until the blades are against the cutting face, said second position defining a starting position;

setting a time period for pelletizer operation;

operating the pelletizer;

providing a controller with input from a first feedback mechanism and a second feedback mechanism during operation of said pelletizer, said first feedback mechanism providing the controller with data on pelletizer motor load amperes and said second feedback mechanism providing the controller with data relating to a linear distance of the blades from the die plate;

after the time has elapsed, interpreting, by said controller, said input from said first and second feedback mechanisms to provide automated feedback to said cutter hub position control device, said cutter hub position control device using the automated feedback to determine linear movement of the motion control rod to adjust the position of the cutter hub and blades with respect to the cutting face so as to maintain the position of the cutter hub within a desired operating range and define a next starting position; and resetting the time period for pelletizer operation before determination of a next cutter hub position adjustment.

18. The method as set forth in claim 17, wherein said cutter hub position control device controls linear movement of the motion control rod to maintain the pelletizer motor load amperes within a desired operating range.

19. The method as set forth in claim 17, wherein the desired operating range includes a range of values determined by the first and second feedback mechanisms and relative to the home position and the starting position.

20. The method as set forth in claim 17, wherein the step of invoking a feedback mechanism further includes using a controller to provide automated feedback to said cutter hub position control device based on at least one parameter selected from the group consisting of forces of the extruded polymer, transport fluid flow rate, and rotation of the cutter hub itself.

* * * * *